(12) United States Patent  (10) Patent No.: US 9,119,385 B2
Cooper  (45) Date of Patent: Sep. 1, 2015

(54) HANDLE SYSTEM FOR FISHING ROD

(76) Inventor: John Cooper, Satellite Beach, FL (US)

( * ) Notice: Subject to any disclaimer, the term of this patent is extended or adjusted under 35 U.S.C. 154(b) by 485 days.

(21) Appl. No.: 13/438,172

(22) Filed: Apr. 3, 2012

(65) Prior Publication Data

US 2012/0255215 A1  Oct. 11, 2012

Related U.S. Application Data

(60) Provisional application No. 61/471,884, filed on Apr. 5, 2011.

(51) Int. Cl.
*A01K 97/00* (2006.01)
*A01K 87/04* (2006.01)
*A01K 87/06* (2006.01)
*A01K 87/08* (2006.01)
*A01K 89/00* (2006.01)

(52) U.S. Cl.
CPC .................. *A01K 87/06* (2013.01); *A01K 87/08* (2013.01); *A01K 89/00* (2013.01)

(58) Field of Classification Search
CPC ........ A01K 87/04; A01K 87/08; A01K 97/10
USPC ........... 43/21.1, 22, 23, 24, 25; 242/223, 273, 242/310, 316, 397, 397.2, 397.3, 397.4, 242/404, 404.2, 405, 323, 275
See application file for complete search history.

(56) References Cited

U.S. PATENT DOCUMENTS

| | | | | |
|---|---|---|---|---|
| 1,043,397 A * | 11/1912 | Capell | ............................ | 242/273 |
| 1,614,104 A * | 1/1927 | Comstock | ..................... | 242/275 |
| 2,158,104 A | 5/1939 | Bowen | | |
| 2,305,045 A * | 12/1942 | Torrence | .................... | 242/482.5 |
| 3,372,510 A | 3/1968 | Arsenault | | |
| 3,769,737 A * | 11/1973 | Miyamae | ....................... | 242/273 |
| 4,037,326 A * | 7/1977 | Booth et al. | ..................... | 33/756 |
| 5,524,831 A * | 6/1996 | Carlson | ......................... | 242/223 |
| 5,531,041 A * | 7/1996 | Betto | ................................ | 43/24 |
| 5,924,639 A * | 7/1999 | Atherton | ........................ | 242/322 |
| 6,237,274 B1 | 5/2001 | Head et al. | | |
| 6,460,285 B2 | 10/2002 | Collins | | |
| 7,028,937 B2 * | 4/2006 | Hitomi et al. | ................. | 242/311 |
| 7,854,086 B2 | 12/2010 | Huynh | | |
| 2002/0060258 A1 * | 5/2002 | Ikuta | .............................. | 242/310 |
| 2002/0139886 A1 * | 10/2002 | Tsutsumi | ...................... | 242/316 |
| 2005/0000145 A1 * | 1/2005 | Ohmura et al. | .................... | 43/22 |

* cited by examiner

*Primary Examiner* — David Parsley
*Assistant Examiner* — Morgan T Barlow
(74) *Attorney, Agent, or Firm* — Kelly G. Swartz; Widerman Malek LLP

(57) ABSTRACT

A handle system for use with a fishing rod. In one embodiment the system is attachable to a rod having a reel seat and operable in conjunction with a reel having a rotatable spool about which fishing line is wound. An attachment section attaches the reel to the handle system and attaches the handle system to the fishing rod. A handle section includes a handle about which a first hand can be placed to hold the rod while catching a fish. The handle extends in a direction away from the attachment section. A leveling system provides back and forth movement of fishing line along the reel spool when the reel is attached to the handle system and the fishing line is being wound on to the spool.

19 Claims, 6 Drawing Sheets

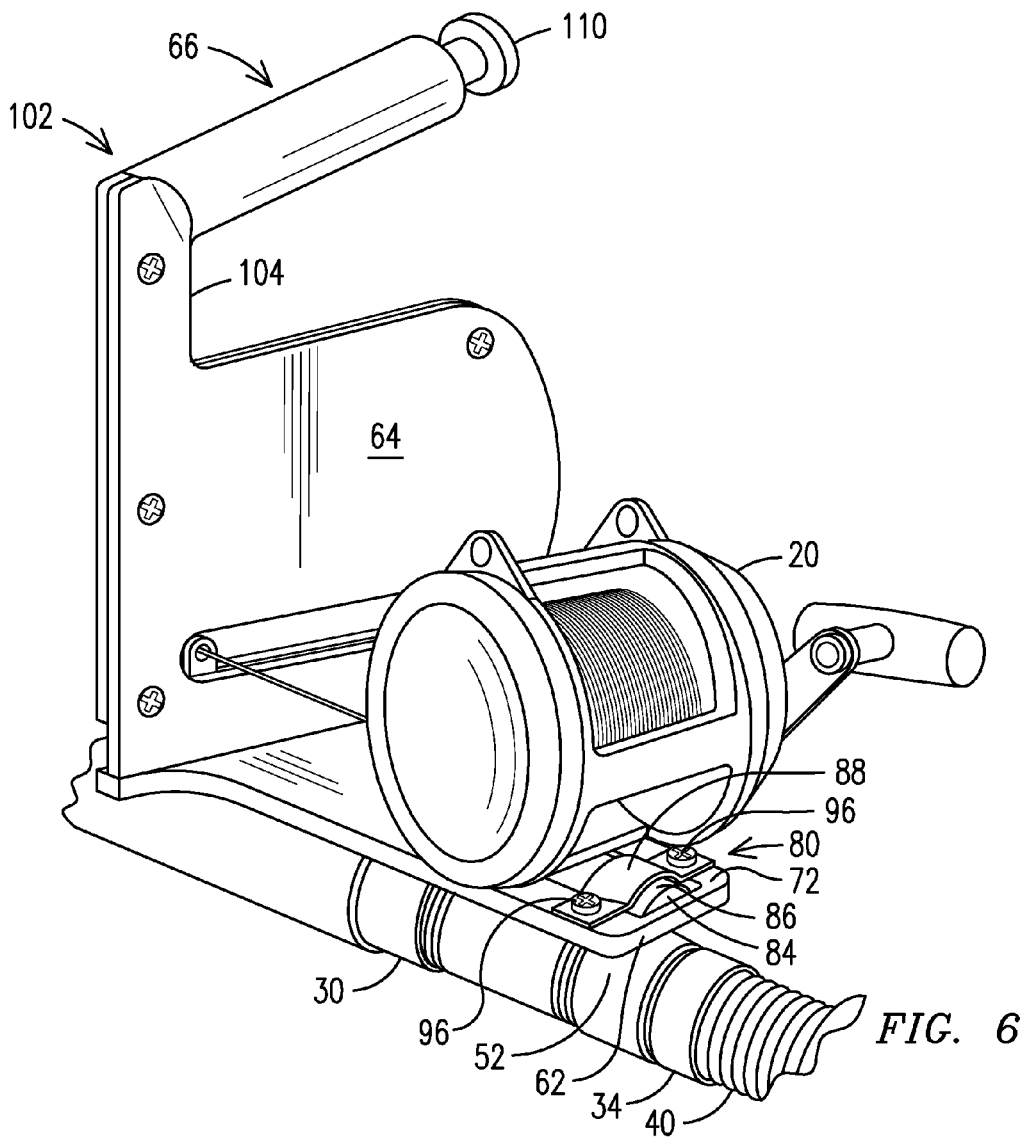
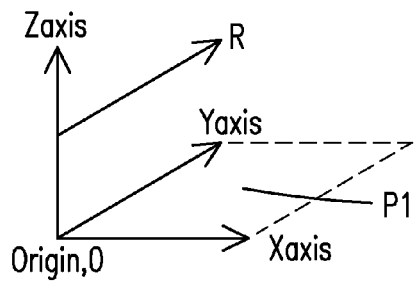
FIG. 9A
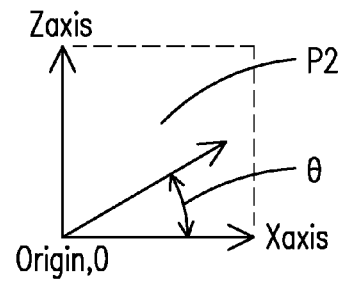
FIG. 9B

HANDLE SYSTEM FOR FISHING ROD

RELATED APPLICATION

This application claims priority to provisional patent application U.S. 61/471,884 filed 5 Apr. 2011 which is incorporated herein by reference in the entirety.

FIELD OF THE INVENTION

The present invention relates to fishing and, more particularly, to improved designs of fishing rod systems used in sport fishing.

BACKGROUND OF THE INVENTION

During fishing it is necessary to raise or otherwise control a fishing rod while under the load of a catch connected to a fishing line. Control of the rod often requires use of muscles which may easily fatigue or lack strength to optimally control the rod when the rod experiences large downward forces. Typically, one hand is placed on the rod handle and the other hand is placed on the reel or on the rod near the reel. There is a need to provide a more optimal arrangement for holding a fishing rod under these conditions.

BRIEF DESCRIPTION OF THE INVENTION

According to one embodiment of the invention, a handle system is provided which is operable in conjunction with a fishing rod and reel, the rod being of a type having a rod reel seat, and the reel being of the type which includes a mounting plate to effect reversible attachment of the reel to the rod reel seat and the reel mounting plate of the type having first and second reel tangs, each reel tang extending in an opposite direction from a mid portion of the mounting plate. The handle system includes an attachment section and a handle section. The attachment section includes a plate having upper and lower opposing sides. The plate includes an adapter mount, formed along the lower side of the plate and configured for attachment to the rod reel seat. The handle section is connected to and extends away from the attachment section plate with the adapter mount facing away from the handle section. The handle section includes a handle also extending in a direction away from the plate. The handle is sized and shaped to be grasped with a hand of a person when fishing.

In another embodiment, a handle system is provided for attachment to a fishing rod having a reel seat. The handle system is operable in conjunction with a reel having a rotatable spool about which fishing line is wound. The handle system includes an attachment section configured to attach the reel to the handle system and attach the handle system to the fishing rod. The system includes a handle section, connected to the attachment section, which includes a handle about which a first hand can be placed to hold the rod while catching a fish. The handle extends in a direction away from the attachment section. A leveling system is operably connected to provide back and forth movement of fishing line along the reel spool when the reel is attached to the system and the fishing line is being wound on to the spool.

In still another embodiment, a handle system is provided for attachment to a fishing rod, the handle system being operable in conjunction with a reel having a rotatable spool about which fishing line is wound. The handle system includes an attachment section configured to attach the handle system to the fishing rod and a handle section, connected to the attachment section. The handle section includes a handle about which a first hand can be placed to hold the rod while catching a fish. The handle extends in a direction away from the attachment section. The attachment section includes an interface plate having first and second opposing sides which extends along directions parallel with a first plane and provides an adaptive feature by which the handle system can be mounted to the rod with the first side of the interface plate facing the rod and the second side of the interface plate facing the handle. When the handle system is mounted to the rod and the rod extends along a first direction parallel to the first plane, a portion of the handle extends along a second plane, different than the first plane. The second plane passes through the first plane, and a predefined length of the handle extends away from the rod at an angle greater than zero degrees and less than ninety degrees with respect to the first plane.

BRIEF DESCRIPTION OF THE FIGURES

Numerous features, aspects, and advantages of the present invention will become better understood when the following detailed description is read with reference to the accompanying drawings in which like characters represent like parts throughout, and wherein:

FIGS. 5, 6 and 7 are perspective views which illustrate features of a handle system according to an embodiment of the invention;

FIGS. 9A and 9B are, respectively, three and two dimensional graphs in a Cartesian coordinate system which illustrate relationships between components and planes along which components of the handle system of FIGS. 5-7 are formed.

In accordance with common practice, the various described features may not be drawn to scale in order to emphasize specific features relevant to the invention.

DETAILED DESCRIPTION OF THE INVENTION

Figure 1:
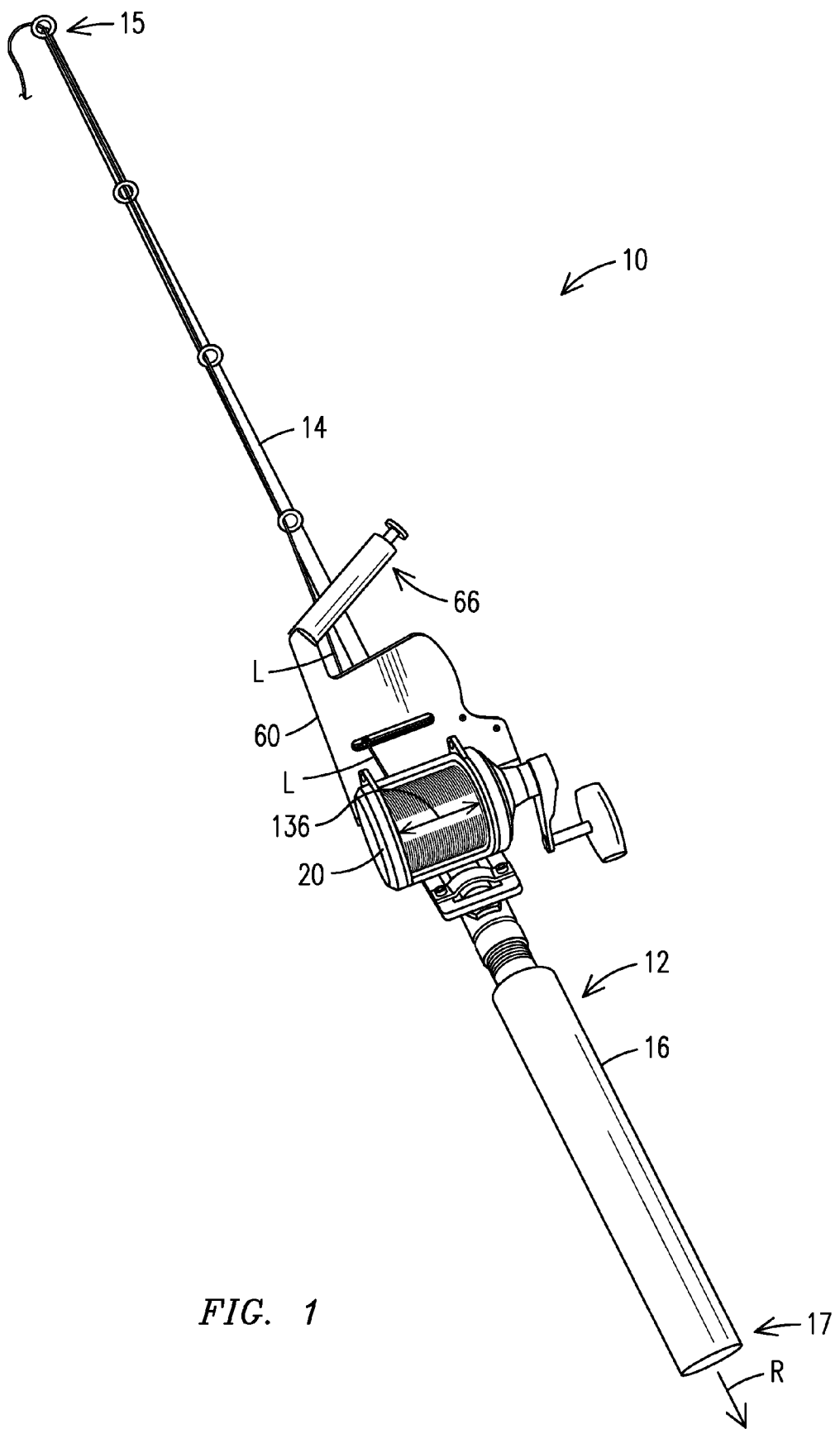
FIG. 1 is a perspective view illustrating a fishing rod system according to an embodiment of the invention.
Figure 2:
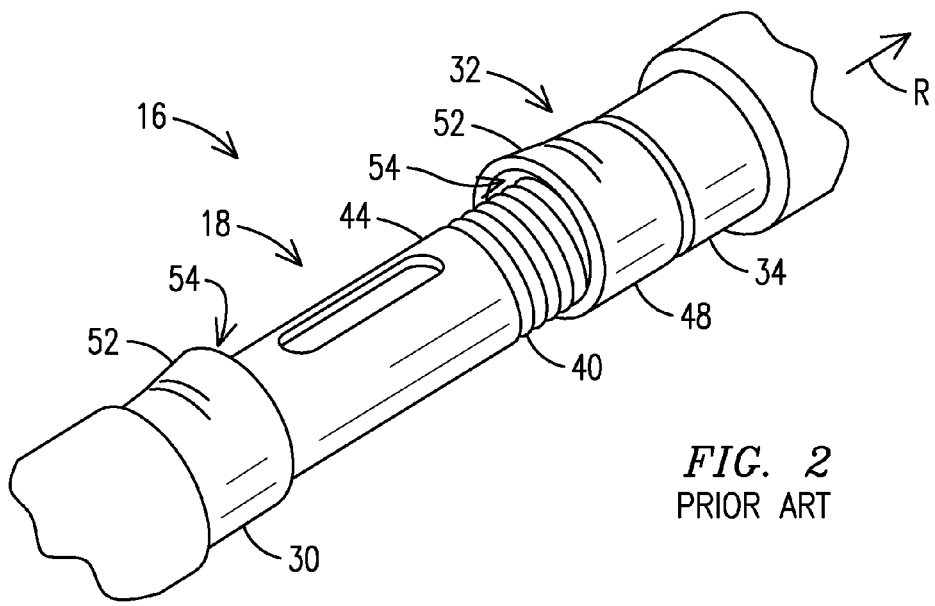
FIG. 2 illustrates a conventional design of a fishing rod reel seat.
Figure 3:
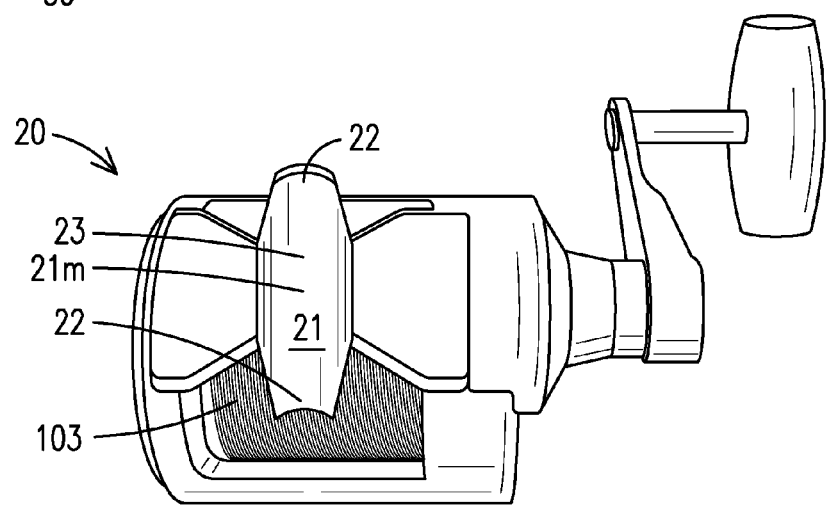
FIG. 3 further illustrates features of a reel shown in FIG. 1.

FIG. 1 illustrates a fishing rod system 10 according to an embodiment of the invention. The illustrated rod system 10 is of the type utilized for deep sea fishing, it being understood that the principles of the invention are intended to be applied to a variety of other fishing rod systems. The system 10 comprises a conventional rod 12 having a rod portion 14 of arbitrary length extending to a first end 15 of the rod 12 and a rod handle 16 extending to a second opposing end 17 of the rod 12. A rod reel seat 18 is positioned along or adjacent to the rod handle 16 as further illustrated in FIG. 2, e.g., between the first end 15 and a portion of the handle 16. Conventionally, as shown in FIG. 2, the rod reel seat 18 is tubular in shape, having a convex surface portion which receives a casting reel 20 shown in FIG. 1. The illustrated rod reel seat 18 is equivalent to the substantially universal design found on a majority of deep sea fishing rods, being adapted to receive an elongate reel plate 21 attached to the reel 20 as shown in FIG. 3. The reel plate 21 which is attached to the reel 20 typically has a pair of reel tangs 22, each reel tang 22 positioned at an opposing end of the reel plate 21, extending away from a mid portion 21m of the plate 21. Each reel tang 22 extends in a direction away from the other tang as shown for the reel 20 in FIG. 3. The side 23 of the reel plate 21 (including the reel tangs 22) facing away from the reel 20 (as shown in FIG. 3) is designed to come into contact with the portion of the rod handle 16 where the rod reel seat 18 is positioned. Accordingly, as is common for many casting reels, at least a portion of the side 23 of the elongate reel plate 21 has a concave curvature which matches or complements the convex curvature of a portion of the rod reel seat 18.

Figure 4:
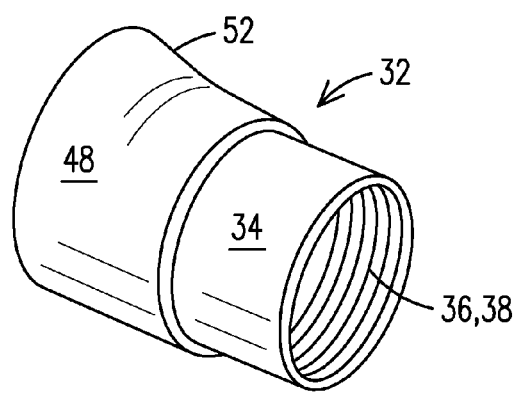
FIG. 4 further illustrates features of a moveable ring shown in FIG. 2.

The reel tangs 22, which extend in opposing directions, typically fit within openings formed in rings positioned along the rod reel seat 18 to secure the reel 20 to the rod 12. As shown in FIG. 2, reel seats according to many conventional designs include a first ring 30 which is fixed in place on or along the rod 12 and a second moveable ring 32 spaced apart from the first ring 30 which is also positioned on or along the rod 12. The second ring 32 is typically a two-part component wherein a first ring segment 34 contains threads 36 formed along an inner surface 38 thereof, as shown in FIG. 4. The threads 36 are in contact with a complementary pattern of threads 40 formed along an outer surface 44 of the rod handle 16. As shown in FIG. 2. Accordingly, the second ring 32 can be displaced along the rod handle 16 in the direction of the first ring 30. In the illustrated embodiment, the first ring 30 is closer to the first rod end 15 than the second ring 32, but in other designs the second ring 32 may be closer to the first rod end 15 than the first ring 30.

As shown in FIGS. 2 and 4, a second ring segment 48 of the second ring 32 is rotatably connected to the first ring segment 34 and is positioned along the rod handle 16 between the first ring 30 and the first ring segment 34. When the threads 36 of the first ring segment 34 are rotated about the threads 40 on the surface 44 of the rod, so that the first ring segment 34 advances toward the first ring 30, the second ring segment 48 is similarly displaced toward the first ring 30. The first ring 30 and the second ring segment 48 each include a flared portion 52 extending radially outward with respect to outer surface 44 of the rod handle 16, each thereby providing an opening 54 suitable for receipt of one of the tangs 22 of the reel 20. With each of the reel tangs 22 positioned in one of the openings 54, as the moveable second ring 32 is turned along the threads 40 on the rod 12, each of the flared portions 52 securely captures one of the reel tangs 22 and thereby firmly attaches the reel 20 to the rod handle 16.

Figure 5:
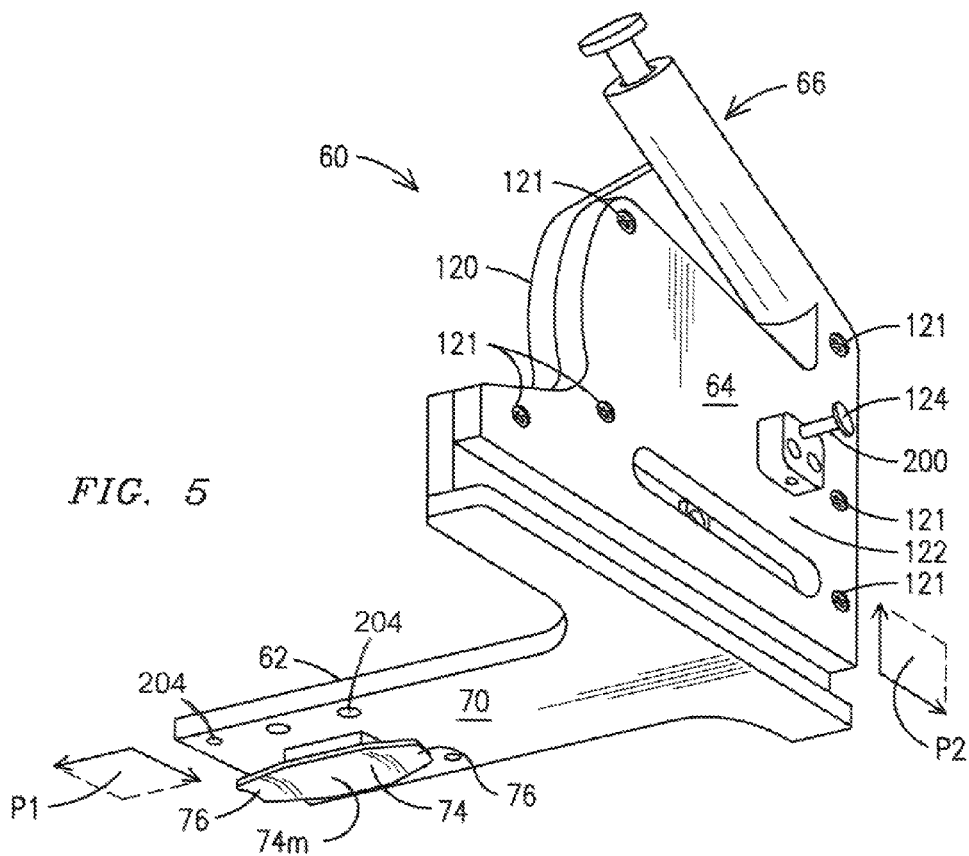

However, according to embodiments of the invention, the reel 20 is not positioned for direct attachment to the reel seat 18. Instead, as shown in FIG. 5, a handle system 60 includes an attachment section and a handle section. The attachment section includes an interface plate 62. When the handle system 60 is installed to provide the fishing rod system 10, the interface plate 62 is interposed between the reel 20 and the rod 12. With reference also to FIGS. 5 and 6, the handle system 60 also comprises an optional leveling system 64 attached to the interface plate 62. The handle section includes an upper handle 66, attached to the leveling system 64, which is positioned to extend above and away from the rod 12 when mounted thereto. The leveling system 64 and upper handle 66 are formed along a plane extending away from the interface plate 62. A feature of this embodiment is that the interface plate 62 and the leveling system 64 collectively function as a bracket which attaches the upper handle 66 to the rod 12.

Figure 7:
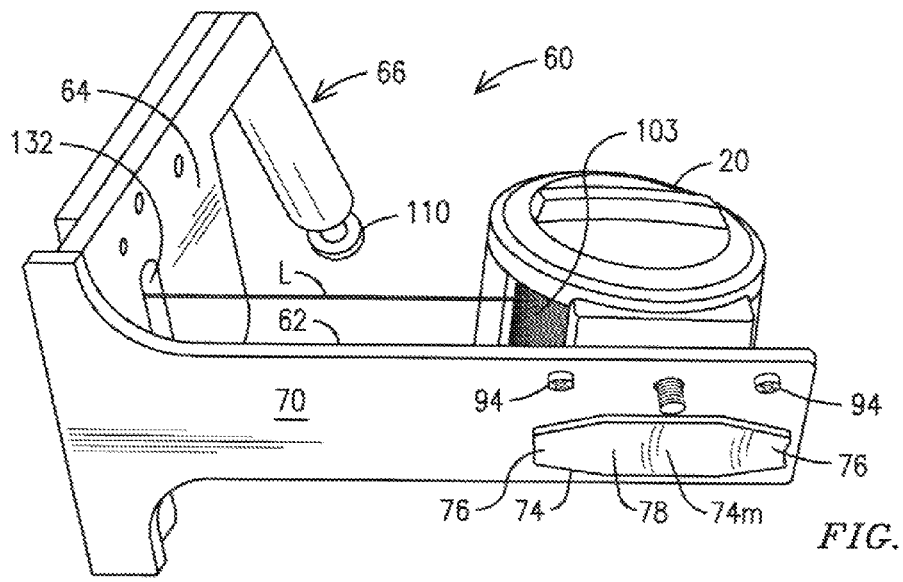

Summarily, the interface plate 62 is an adapter having first and second opposing sides 70, 72 formed along a first plane P1. The first side 70, referred to as a lower side of the plate 62 is mounted to the rod reel seat 18 and the second side 72, referred to as an upper side of the plate 62, faces away from the rod 12. The sides 70, 72 each extend along directions parallel to the plane P1. The reel 20 is mounted to the upper side 72 of the interface plate 62. With this arrangement the upper handle 66 is attached to the interface plate and positioned above the rod 12 without there being interference with movement of the fishing line L, shown in FIGS. 1 and 7, between the reel 20 and the first end 15 of the rod 12. As shown in FIGS. 5 and 7, an adapter mount 74, affixed to the lower side 70 of the interface plate 62, extends away from the upper handle 66 and away from the lower surface 70 of the plate 62 to provide for attachment of the plate 62 to the rod reel seat 18. The adapter mount 74 comprises a surface 78 which faces away from the interface plate 62 and a pair of adapter tangs 76, equivalent in size and shape to the reel tangs 22 of the reel 20. Each adapter tang 76 extends away from a mid portion 74m of the adapter mount, in a direction opposing the direction in which the other tang extends. With this configuration each tang can be positioned to fit within the openings 54 shown in FIG. 2 provided by the flared portions 52 of the first and second rings 30, 32 which are positioned along the rod reel seat 18. At least a portion of the surface 78 of the adapter mount 74 which faces away from the interface plate 62 has a concave curvature, like the curvature of the side 23 of the reel plate 21, rendering it suitable for stable and secure placement against the convex curvature of a portion of the rod reel seat 18 against which the adapter mount 74 is positioned when the handle system 60 is mounted as a component of the fishing rod system 10.

With each of the adapter tangs 76 shown in FIGS. 5 and 7 positioned in one of the openings 54 (see FIG. 3), as the moveable second ring 32 shown in FIGS. 2 and 4 is turned along the threads 40 formed on the rod 12 (see FIGS. 2 and 6), each of the flared portions 52 securely captures one of the adapter tangs 76 in an opening 54 and thereby firmly attaches the interface plate 62 to the rod reel seat 18 via the adapter mount 74, as shown in FIGS. 6 and 7.

FIG. 6 provides a partial view of a handle system reel seat 80 formed along the upper side 72 of the interface plate 62. The handle system reel seat 80 is functionally equivalent to the rod reel seat 18 for receiving the tangs 22 of the reel 20. See FIG. 8 which more fully illustrates components of the handle system reel seat 80 without the reel 20 positioned thereon. The handle system reel seat 80 comprises a ridge 84 having a surface 86 extending outward from the upper side 72 of the interface plate 62 for contact with the side 23 of the reel plate 21 which faces away from the reel 20. As noted above, in many conventional fishing reels such as the reel 20, at least a portion of the reel plate 21 has a concave curvature which matches the convex curvature of the portion of the rod handle 16 where the rod reel seat 18 is positioned. Similarly, the surface 86 of the ridge 84 of the handle system reel seat 80 provides a convex curvature which matches the concave curvature along the side 23 of the reel plate 21. The convex curvature of the surface 86 of the ridge 84 is approximately equal and opposite the concave curvature along the side 23 of the reel plate 21. That is, the curvatures of the surfaces are complementary such that when the side 23 of the reel plate 21 is placed against the surface 86 of the ridge 84, the mating of complementary curvatures provides for stable positioning, e.g., without wobbling, of the reel plate 21 against the ridge 84. The reel plate 21 can thus be secured to the interface plate 62. Securement of one to the other can be had with a variety of well known fastening techniques. For example, with reference to FIGS. 5 6, 7 and 8, a clamping arrangement can be effected with a pair of beveled straps 88, 90 which are fastened to the interface plate 62 utilizing through-holes 204 with screws 94 and nuts 96. Surfaces of the straps 88, 90 which face the interface plate 62 have curvature which closely matches that of regions to which contact is made by the straps 88, 90 along the side of the reel plate 21 which faces the reel 20.

In the illustrated embodiment shown in FIGS. 1, 5,6,7,8, and 10, the interface plate 62 is aluminum, the adapter mount 74 is welded to the lower side 70 of the interface plate 62 and the ridge 84 of the handle system reel seat 80 is machined along the upper surface 72 of the interface plate 62. In other embodiments the combination of the interface plate 62, adapter mount 74 and handle system reel seat 80 may be integrally formed in a casting process involving metallic or resilient, light weight non-metallic materials, e.g., composite materials. In still other embodiments, the three components are individually formed and connected to one another with removable fasteners. However, the formation of the interface plate 62, adapter mount 74 and handle system reel seat 80 as one unit, i.e., without requiring removable fasteners to connect one to another, provides a level of strength, stability and durability which may be preferred over an assembly wherein the three components are individually formed and connected to one another with fasteners.

Figure 8:
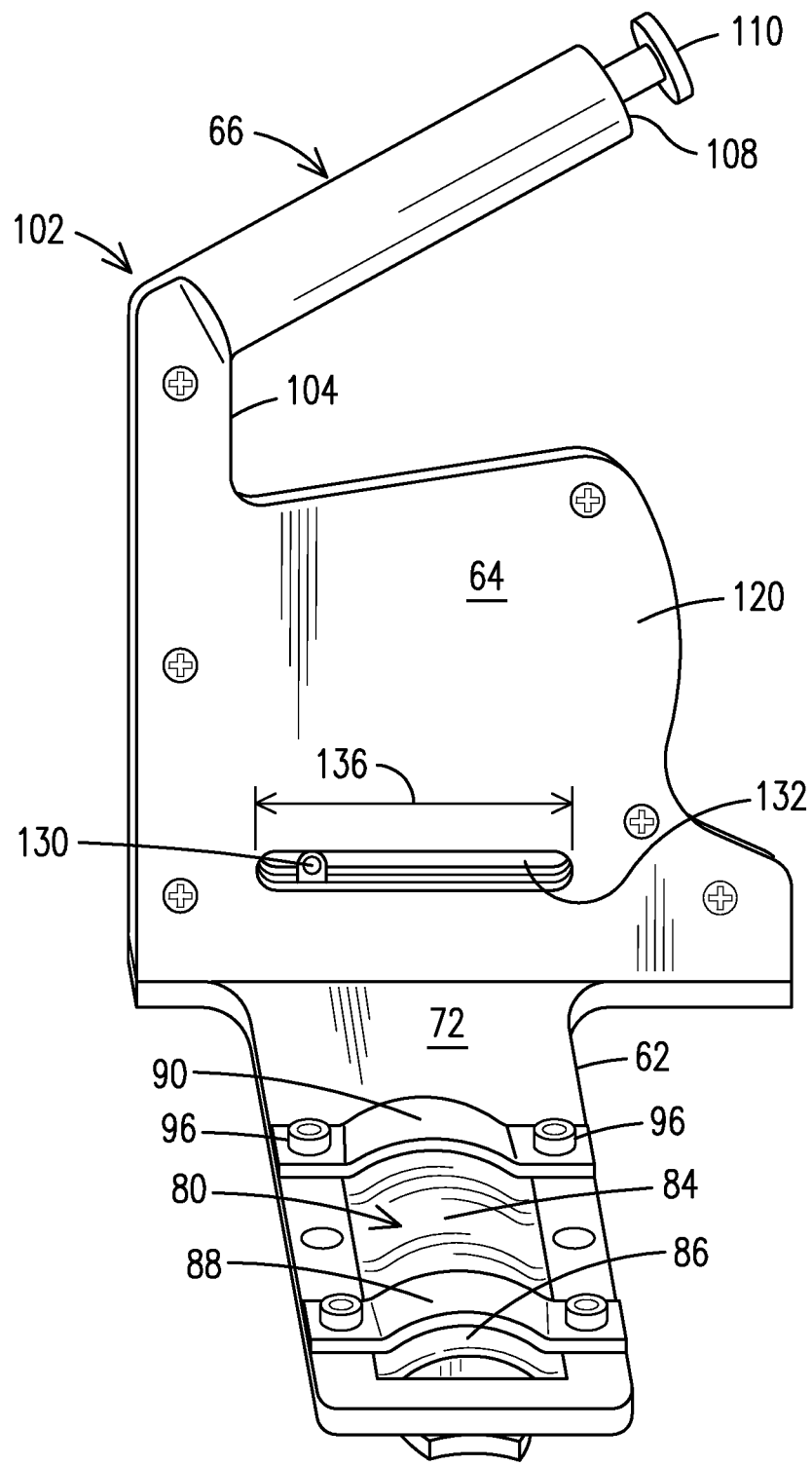
FIG. 8 further illustrates components of a reel seat of the handle system without a reel positioned thereon.

Another feature of the fishing rod system 10 is that the upper handle 66 of the system 60 is affixed to the interface plate 62. When the interface plate 62 is mounted to the rod handle 16 as described above, the upper handle 66 extends away from the rod handle 16. With the reel 20 installed on the interface plate 62 as described above, when the rod 12 is held in a position for fishing, the upper handle 66 extends away from the rod handle 16 and beyond (e.g., above) the reel 20. Accordingly, the person using the rod has an opportunity to grip the rod handle 16 with one hand (e.g., the right hand for the illustrated embodiment) and grip the upper handle 66 with the other hand. The geometry of the upper handle 66 relative to the rod 12 provides advantages to the user. In the illustrated example, as shown in FIG. 5, the surfaces 70, 72 of the interface plate 62 are in planes parallel to the plane P1. When the system 60 is attached to the rod 12, the axis R, shown in FIG. 2, along which the rod extends (i.e., the rod axis) is parallel to the plane P1 shown in FIG. 5. Both the leveling system 64 and the upper handle 66 shown in FIG. 5 are in a plane P2 which cuts through the plane P1 and the rod axis R. For the illustrated embodiments, the planes P1 and P2 are orthogonal to one another, but this is not necessary. Further, the upper handle 66 is canted with respect to the plane P1 and the surfaces 70, 72 of the interface plate 62. See FIGS. 9A and 9B which are useful for defining exemplary relationships between these components in an X, Y, Z Cartesian coordinate system. Each of the axes X, Y and Z of the coordinate system is perpendicular to the other two axes and the three axes intersect at an origin, O. With reference to the three dimensional view of the coordinate system shown in FIG. 9A, the plane P1 containing the X and Y axes is parallel to the side 70 of the interface plate 62 and the plane P1 includes the rod axis R (i.e., the axis extending from the first end 15 to the second end 17) such that the rod axis R is positioned in a direction parallel with the Y axis. When mounted on the rod reel seat 18, the upper and lower surfaces 70, 72 of the interface plate 62 extend along planes parallel with the plane P1 defined by the X and Y axes. The leveling system 64 then extends along a plane P2 defined by the X and Z axes. With reference to the two dimensional illustration of FIG. 9B, the X and Z axes define a plane along which the upper handle 66 extends at an angle, $\theta$, measurable about the origin, O and with respect to the X axis. In the illustrated embodiment, the upper handle 66 resides in a plane parallel with the plane defined by the X and Z axes at an exemplary angle $\theta=30°$ with respect to the X axis or with respect to the plane P1. The upper handle 66 may be in the shape of a cylindrical body having a length of nine to twelve cm and a diameter of about two to three cm. More generally, the upper handle 66 may be of varied size suitable for a person to securely hold (e.g., grip) the upper handle 66 with the fingers of one hand. The illustrated upper handle 66 is suited for grasping with a person's left hand. As shown in FIGS. 6 and 8, a lower end 102 of the upper handle 66 extends from an arm 104 integrally formed with the leveling system 64. The arm 104 and the leveling system 64 provide the function of a bracket connecting the upper handle 66 to the interface plate 62. In other embodiments which do not include a leveling system the arm 104 may simply connect the lower end 102 of the upper handle 66 with the interface plate 62. The arm 104 is shown in FIGS. 6 and 8 to be a vertical member, i.e., parallel with the Z axis of FIGS. 9A and 9B, extending from the left side of the leveling system 64 relative to the perspective view shown in FIG. 8. Other arrangements are contemplated so long as a suitable height for the lower end 102 of the upper handle is achieved, e.g., thirteen to eighteen cm above the interface plate 62. In other embodiments the arm 104 may extend upwards from the right side of the interface plate 62 with the upper handle 66 configured to accommodate a person's right hand, e.g., with $\theta=150°$. In still other embodiments, the upper handle 66 need not be formed in a plane parallel with the plane formed by the X and Z axes shown in FIG. 9. Although the illustrated embodiment describes the upper handle 66 as being at an angle $\theta=30°$, it is to be understood that the angle $\theta$ may range five, ten or more degrees above or below 30° (e.g., from less than twenty degrees to more than fifty degrees with respect to the plane formed by the X and Y axes shown in FIG. 9A) while providing benefits to the user. Still, more generally, the upper handle 66 is formed at an angle other than zero degrees and other than ninety degrees with respect to the plane P1 formed by the X and Y axes shown in FIG. 9A.

With the upper handle 66 there is an improved ability to control the rod 12 relative to a conventional arrangement wherein the user places one hand on the rod handle and the other hand on the rod in a position beyond the reel. For purposes of describing advantages of the system 10 it is assumed that the user places the right hand on the rod handle and places the left hand either on the rod (beyond the reel) or on the upper handle 66, although the invention may be practiced with the user's right hand gripping the upper handle 66. The benefits of the illustrated design are especially apparent when the first end 15 of the rod 12 is subjected to downward forces which occur during a catch. Under such conditions, with the conventional arrangement primary muscle groups applied to support the rod under load with the left hand include the muscles of the forearm as well as bicep muscles. The muscles associated with the forearm are relatively weak compared to the biceps, shoulder muscles and back muscles which can be used to support the rod 12. In a manner somewhat analogous to the adage that a chain is only as strong as its weakest link, the effectiveness of the user's arm is limited by the strength of the muscles controlling the forearm. That is, it is not uncommon for the angler to experience fatigue in the weaker muscle group while trying to maintain line pressure. This can result in a slackening of the line, which can cause the hook to disengage from the fish. According to principles of the invention, by rotating the left forearm to the exemplary $\theta=30°$ angle to grip the upper handle 66, the user is able to more effectively utilize the bicep muscles and shoulder muscles to support the rod 12. In addition, with the left hand firmly holding the canted upper handle 66, the upper, middle and lower back muscle groups can play a more significant role in supporting the rod when experiencing the downward force Summarily, in the past, muscle stress and fatigue, particularly in the forearm, have played a major role in limiting the ability to land fish. The upper handle 66 greatly increases the ability to perform that operation more effectively.

Embodiments of the invention contemplate use of both level wind reels and manual reels. These reels, including the reel 20, include rotatable spools. As shown in FIGS. 3 and 7 the fishing line L is wound or unwound about such a spool 103. In the past, without an automatic level wind mechanism it has been necessary to spread the fishing line back and forth along the spool 103 on the casting reel 20 with use of the thumb. It is often preferred to perform manual spreading of the fishing line with the thumb as the line is wound back on a reel. The leveling system 64 of the rod system 10 provides for such back and forth movement along the spool 103 to spread or evenly disperse retrieved portions of the line L on the reel spool 103, but without requiring direct contact between the thumb and the fishing line. As shown in FIG. 8, at an upper end 108 of the upper handle 66, opposite the lower end 102, the handle 66 includes a control 110 for leveling of the fishing line L with the leveling system 64. In the example embodiment the control 110 is a depressible actuating button, operable with the thumb of the same hand which grasps the upper handle 66, to manually control leveling of the line with the leveling system 64. The control 110 is positioned on the handle section to operate the leveling system with a first hand while simultaneously holding the fishing rod with the same hand. The leveling system 64 may be disabled when rod systems according to the invention incorporate level wind reels. Although the control is illustrated as a manually operated mechanism, the control may be automated or powered.

The illustrated embodiment provides an ability to manually spread the line L on the reel spool without direct contact between the thumb and the fishing line. This arrangement reduces risk of injury to the thumb. For example, in the past, rapid and unexpected despooling action caused severe laceration of skin, tendons and blood vessels. Also, in conventional arrangements, when the thumb is used to control line leveling, it is difficult or impossible to simultaneously hold the rod with a closed fist. This results in reduced hand strength when great hand strength is needed to maintain line pressure as well as for preventing the equipment from becoming dislodged and lost. A feature of the disclosed embodiments is that an improved method for spreading the line back and forth when reeling the line L on to the reel spool 103 can be had while also providing an upper handle 66 which enables better use of muscle groups. This can reduce the role of muscles in the forearm and enable the user to apply greater strength and control during times when the first end 15 of the rod 12 is subjected to downward forces while reeling in a fish. The arrangement enables the user to maintain a closed first position to hold the rod with one hand grasping the upper handle 66 while performing the leveling function with the thumb of the same hand and while using the other hand to operate the reel 20.

Figure 10:
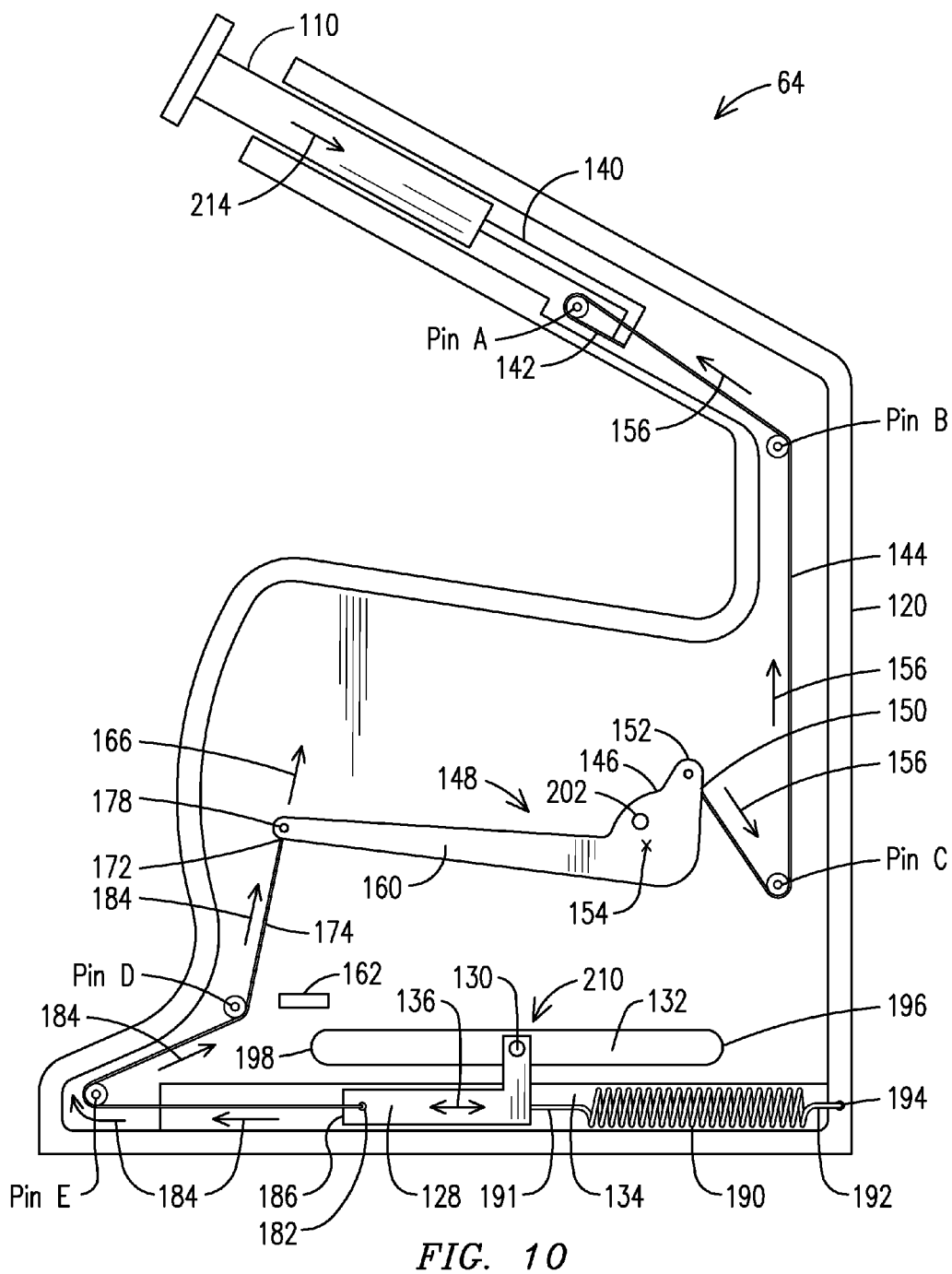
FIG. 10 illustrates features of an exemplary embodiment of a leveling system which may be incorporated in the handle system shown in FIGS. 5-7.

The leveling system 64 is manual in the sense that the user is able to control the leveling with actuation of the leveling control 110, but the invention is not so limited. More fully automated systems can also be implemented in the rod system 10 based in part on principles with which the leveling system 64 operates as now described. FIG. 10 provides a simplified schematic presentation of the leveling system 64 to provide a conceptual understanding of the principles with which the system operates. The leveling system 64 as illustrated in FIGS. 5, 8, and 10 is housed in an assembly comprising a front plate 120 on which numerous operable components are mounted and a cover plate 122 on which a depressible release button 124 is mounted.

The front plate 120 is firmly attached to the interface plate 62. In the example illustration the plates 62 and 120 are formed of aluminum plate metal and are attached to one another with a weld joint to provide suitable strength and stability to the handle system when the system 60 experiences significant forces, e.g., as the first end 15 of the rod 12 to which it is attached experiences large forces. In other embodiments the plates 62 and 120 may be integrally formed in a casting process where the components are formed of metallic or non-metallic materials, e.g., composites.

The front plate 120 and the cover plate 122 are attached to one another with conventional fastening means such as a series of screws 121 which pass through the cover plate 122 and are secured within threaded apertures (not shown) formed along the inside surface of the front plate 120. The release button 124 activates a locking mechanism to configure the system for use without operation of the leveling feature. FIG. 10 provides a schematic view of the interior of the front plate 120. The illustrated components are shown in simplified form with certain details omitted for purposes of adding clarity to the illustration.

With reference to FIGS. 5, 8 and 10, the system 64 includes a leveling actuator 128 having an eyelet 130 extending into an opening 132 for reciprocating motion of the eyelet 130 along the opening 132 to guide movement of fishing line L during the reel winding process. The opening 132 is formed through both the front plate 120 and the cover plate 122. The fishing line is not shown in FIG. 10, but it is to be understood that the line L extends from the spool on the reel 20, and through the opening 132, i.e., through the front plate 120, through the eyelet 130, through the cover plate 122, and then through a series of conventional eyelets formed on the rod 12 to the first end 15 of the rod. The opening 132 extends a distance, e.g., seven to ten cm, along a horizontal plane parallel to the plane formed by the X and Y axes shown in FIG. 9A, which distance is based on the width of the spool on which the fishing line is wound. The leveling actuator 128 is positioned in a slot 134, formed in the front plate 120, to provide guided reciprocating motion in directions indicated by the double arrow 136, back and forth along the X axis shown in FIG. 9A.

The actuating button 110 is mechanically coupled to a slide actuator 140 to which a first end 142 of a first cord segment 144 is attached. Mounted on the cover plate 122 are a series of pins A, B, C, D and E which may be stationary or of the rolling type. The first cord segment 144 extends along and about the pins A, B and C to guide the cord segment to a short arm 146 of an offset lever 148. A second end 150 of the first cord segment 144 is secured to the short arm 146 at an attachment point 152. The offset lever 148 is mounted for rotational motion about a pivot point 154 on the front plate 120. The attachment point 152 on the short arm 146 is spaced away from the pivot point 154, e.g., one to two cm. With displacement of the first cord segment 144 in directions indicated by the arrows 156 shown in FIG. 10, the long arm 160 of the offset lever 148 is urged away from a stop 162 in the direction of the arrow 166. A first end 172 of a second cord segment 174 is fixed to an attachment point 178 on the long arm 160 of the offset lever 148. The attachment point is, in this example, spaced away from the pivot point 154 by a distance in the range of about five to eight cm. The second cord segment 174 extends from the attachment point 178 on the lever along and about the pins D and E to another attachment point 182 on the leveling actuator 128 to which a second end 186 of the second cord segment 174 is attached. Thus when the long arm 160 of the offset lever 148 is displaced away from the stop 162 in the direction of the arrow 166, the second cord segment 174 is displaced in directions indicated by arrows 184 shown in FIG. 10.

The leveling actuator 128 is coupled to a spring 190. A first end 191 of the spring 190 is affixed to the leveling actuator 128 and a second end 192 of the spring 190 is affixed to a point 194 on the front plate 120 at one end of the slot 134. Based on movement of the leveling control 110 (i.e., operating as an actuating button) the eyelet 130 is displaced with movement of the leveling actuator 128 between first and second end points 196, 198 between which the opening 132 extends, e.g., seven to ten cm, along the horizontal plane. When the release button 124 shown in FIG. 5 is not engaged to activate the locking mechanism, and the actuating button 110 is not depressed, the spring urges the leveling actuator 128 to a position closest to the point 194, so that the eyelet 130 is positioned at the first end 196 of the opening 132 as shown in FIGS. 5 and 8. In this configuration the long arm 160 presses against the stop 162. When the release button 124 is not engaged to activate the locking mechanism, and the actuating button 110 is fully depressed, the long arm 160 is moved a maximum distance from the stop 162, and the leveling actuator 128 is displaced to a position farthest away from the point 194 so that the eyelet 130 is positioned at the second end point 198 of the opening 132.

The release button 124 comprises a pin 200 (see FIG. 5) which selectively extends through the cover plate 122 and into an aperture 202 formed in the lever 148 near the pivot point (e.g., distanced 0.5 cm or less from the pivot point) to lock the lever in place so that the eyelet 130 is fixed at a centered position 210 relative to the first and second end points 196, 198 of the opening 132. The aperture 202 is aligned with the pin 200 and the offset lever 148 is locked by effecting rotation of the offset lever 148 with a depression of the leveling control 110 while also depressing the release button 124. The pin 200 slides into the aperture 202 when the pin 200 and the aperture 202 are aligned, thereby locking the offset lever 148 and fixing the eyelet 130 at the centered position 210. Unlocking the lever 148 to allow movement of the eyelet 130 is accomplished by pulling the release button 124 away from the cover plate 122, thereby removing the pin 200 from the aperture 202.

Operation of the leveling system 64 begins with the release button 124 disengaged, i.e., pulled so that the pin 200 is removed from the aperture 202, so that the locking mechanism is not activated, followed by depression of the leveling control 110, referred to as the actuating button 110. Depression of the button 110 in opposition to the force of the spring 190 displaces the slide actuator 140 in the direction of the arrow 214 so that the first cord segment 144 is displaced about the pin A in a counter clockwise direction as the first end 142 of the cord segment 144 follows movement of the slide actuator 140. Consequently the first cord segment 144 is displaced in directions indicated by the arrows 156. This rotates the offset lever 148 so that the long arm 160 is displaced away from the stop 162. Such movement of the long arm 160 displaces the second cord segment 174 which, in turn, displaces the leveling actuator 128 in a direction away from the point 194 so that the eyelet 130 moves to the end point 198 of the opening 132. Movement of the leveling actuator 128 counters a force associated with the spring 190 so that, upon release of the actuating button (i.e., leveling control) 110, the leveling actuator 128 is displaced toward the point 194 and the eyelet 130 is moved to the end point 196 of the opening 132. Thus repetitive depression and release of the button 110 causes cyclic travel of the eyelet between the end points 196 and 198. With the fishing line L passing through the eyelet 130 as the line is reeled on to the spool 103 of the reel 20, the cyclic travel of the eyelet 130 carries the line back and forth across the spool 103 with reciprocating motion in directions indicated by the double arrow 136. See, also, FIG. 1. This effects level winding of the line L on the spool 103.

Numerous components of the system 10 have been illustrated, it being understood that the components may be formed from a variety of materials and manufacturing processes. For example, many of the components can be manufactured from plastics or in resin molded processes in addition to manufacture with carbon fiber and various composites used for sports equipment. The cord segments 144, 174 may be formed from braided line, e.g., one hundred pound test line, or a variety of other materials, including stainless steel. Depending on the forces with which the leveling actuator 128 and other components are designed to be moved, various choices of materials are available for fabricating the afore described components to meet the line strength requirements. One embodiment of the leveling system 64 has been described which utilizes cord segments to provide a design having relatively few moving parts. However, the size or weight of the leveling unit or the overall size or weight or profile of the handle system 60 can be reduced by utilizing other designs for the leveling system. For example, a more compact leveling system may be provided with a design based on use of cams or gears in lieu of cord segments.

A fishing rod system 10 has been described in an embodiment that has modular components including a rod 12, an interface plate 62, an optional leveling system 64 attached to the plate 62 and an upper handle 66. Numerous components can be integrally formed. For example, the handle system reel seat 80 and/or the upper handle 66 may be formed with the rod handle 16 out of composite material in a molding process instead of being detachable. On the other hand, in order to effect efficient storage of the fishing rod system 10 it may be preferred to form the handle system 60 separate from the rod 12. The handle system can be made available as an aftermarket product or may be otherwise provided as a separate unit, e.g., accompanying the sale of new rods. This facilitates interchangeability and retrofit use of the handle system 60 with other rods.

When the leveling system is not included as part of the rod system 10, the arm 104 may simply extend to connect the end 102 of the upper handle 66 with the interface plate 62. In such cases the arm 104 and interface plate 62 may be welded to one another or may be integrally formed in a molding process.

Although limited embodiments of an inventive handle system have been described, numerous alternate designs will be apparent to those skilled in the art and such designs do not depart from the inventive concepts described herein. Accordingly the scope of the invention is only limited by the claims which now follow.

The claimed invention is:

1. A handle system operable in conjunction with a fishing rod and reel with fishing line, the rod having a rod reel seat, the reel being of the type which includes a mounting plate to effect reversible attachment of the reel to the rod reel seat, the reel mounting plate having first and second reel tangs, each reel tang extending in an opposite direction from a central portion of the mounting plate, the handle system comprising:

an attachment section including a plate having upper and lower opposing sides, front and back opposing edges, and a midpoint between the front and back opposing edges, the plate including an adapter mount comprising a first adapter tang extending toward the front edge and a second adapter tang extending toward the back edge, formed along the lower side of the plate behind the midpoint of the plate; and a handle section, connected to the upper side of the attachment section plate between the front edge and the midpoint with the adapter mount facing away from the handle section, the handle section including a handle plate having a lower handle plate edge connected to the upper side of the attachment section plate, an upper handle plate edge, two opposing handle plate side edges, an upper handle connected proximate to one of the handle plate side edges and extending over the upper handle plate edge, and an opening having a length disposed within the handle plate between the upper and lower handle plate edges.

2. The handle system of claim 1 wherein:

the rod is of a type which includes a fixed ring and a moveable ring, which can be displaced along the reel seat with respect to the fixed ring, the fixed ring and the moveable ring each having a flared portion which provides an opening suitable to receive one of the first and second reel tangs and secure the mounting plate to the rod reel seat, and the first adapter tang and second adapter tang are configured to be received by the fixed and moveable rings of the rod and secure the adapter mount in like manner to securement of the reel mounting plate to the reel seat.

3. The handle system of claim 1 further comprising a handle system reel seat including a ridge disposed on a portion of the upper side of the plate extending toward the front edge and the back edge behind the centerline of the plate.

4. The handle system of claim 3 wherein the ridge has surface of convex curvature for receiving a concave surface of the reel mounting plate having curvature complementary to the convex curvature so that when the reel mounting plate is attached to the handle system reel seat, the surface of convex curvature is positioned against the concave surface.

5. The handle system of claim 1 further including a mid portion between the adapter mount and the handle section, the adapter mount and mid portion functioning as a bracket which securely positions the handle to the rod reel seat when the handle system is attached to the reel seat.

6. The handle system of claim 5 wherein the mid portion comprises a mechanism for leveling fishing line on the reel.

7. A handle system for attachment to a fishing rod having a reel seat and fishing line, the handle system operable in conjunction with a reel having a rotatable spool about which fishing line is wound, the handle system comprising:

an attachment section including a plate having upper and lower opposing sides, front and back opposing edges, and a midpoint between the front and back opposing edges, the plate including an adapter mount comprising a first adapter tang extending toward the front edge and a second adapter tang extending toward the back edge, formed along the lower side of the plate behind the midpoint of the plate;

a handle section, connected to the upper side of the attachment section plate between the front edge and the midpoint with the adapter mount facing away from the handle section, the handle section including a front plate having a lower front plate edge connected to the upper side of the attachment section plate, an upper front plate edge, two opposing front plate side edges, an upper handle connected proximate to one of the front plate side edges and extending over the upper front plate edge, and an opening having a length disposed within the front plate between the upper and lower front plate edges; and a leveling system operably connected to provide back and forth movement of fishing line along the reel spool when the reel is attached to the handle system and the fishing line is being wound on to the spool.

8. The handle system of claim 7 further including a control positioned on the handle section to enable operation of the leveling system with the first hand to provide the back and forth movement, while simultaneously holding the fishing rod with the first hand.

9. The handle system of claim 8 wherein the control comprises a depressible actuating button, operable with a finger of the first hand while the first hand grasps the handle.

10. The handle system of claim 9 wherein, with the reel attached to the handle system and the handle system attached to the rod, depressing and releasing the button enables manual control of the back and forth movement of the fishing line along the spool as the spool rotates.

11. The system of claim 10 wherein:

the reel with which the handle system mates includes a mounting plate of the type which has first and second reel tangs, extending in opposite directions, used to secure the reel to the rod, and the rod to which the handle system is attachable is of the type which includes a rod seat, a fixed ring positioned along the rod seat and a moveable ring which can be displaced along the rod seat, each of the rings having a flared portion for receiving a tang; and the attachment section comprises an adapter plate which includes a pair of adapter tangs, each adapter tang extending in an opposite direction from a mid portion of the adapter plate, so that each adapter tang can be received in the flared portion of the fixed ring or the moveable ring of the rod to secure the adapter mount in the rod seat in like manner to securement of the reel mounting plate to the reel seat with the reel tangs.

12. The handle system of claim 7 wherein:

the attachment section includes an interface plate having first and second opposing sides, the interface plate extending along directions parallel with a first plane and providing adaptive features by which (i) the handle system can be mounted to the reel seat and (ii) the reel can be mounted to the handle system for operation, with the first side of the interface plate facing the rod and the second side of the interface plate facing the reel; and when the handle system is mounted to the rod and the rod extends along a first direction parallel to the first plane, a portion of the handle extends along a second plane, different than the first plane, which second plane passes through the first plane, with a predefined length of the handle extending away from the rod at an angle greater than zero degrees and less than ninety degrees with respect to the first plane.

13. The handle system of claim 12 wherein the angle at which the predefined length of the handle extends away from the rod ranges between twenty and forty degrees with respect to the first plane.

14. The handle system of claim 12 wherein the angle at which the predefined length of the handle extends away from the rod ranges between twenty five and thirty five degrees with respect to the first plane.

15. A handle system for attachment to a fishing rod, the handle system operable in conjunction with a reel having a rotatable spool about which fishing line is wound, the handle system comprising:

an attachment section including an interface plate having a first and a second opposing side and a midpoint, the interface plate extending along directions parallel with a first plane and the interface plate including an adaptive feature comprising a first adapter tang extending essentially parallel to the first plane in an adapter tang plane and a second adapter tang opposing the first adapter tang and extending essentially parallel to the first plane in the adapter tang plane; and a handle section, connected to the second opposing side of the attachment section between the front edge and the midpoint, including a handle plate having a lower handle plate edge connected to the second opposing side of the attachment section, an upper handle plate edge, two opposing handle plate side edges, an upper handle connected proximate to one of the handle plate side edges and extending over the upper handle plate edge, and an opening having a length disposed within the handle plate between the upper and lower handle plate edges, a first hand can be placed about the upper handle to hold the rod while catching a fish, the upper handle extending in a direction away from the attachment section, wherein:

when the handle system is mounted to the rod and the rod extends along a first direction parallel to the first plane, a portion of the upper handle extends along a second plane, different than the first plane, which second plane passes through the first plane, with a predefined length of the handle extending away from the rod at an angle greater than zero degrees and less than ninety degrees with respect to the first plane.

16. The handle system of claim 15 wherein the angle at which the predefined length of the handle extends away from the rod ranges between twenty and forty degrees with respect to the first plane.

17. The handle system of claim 3 wherein the handle system reel seat further comprises a plurality of mounting holes disposed proximate to the ridge and at least one reel securing device configured with a plurality of securing device apertures alignable with at least one of the plurality of mounting holes wherein a fastening device may be inserted through the aligned securing device aperture and mounting hole to attach the at least one reel securing device to the handle system reel seat.

18. The handle system of claim 1 wherein the upper handle forms an acute angle with respect to the plane of the attachment section.

19. The handle system of claim 6 wherein the mechanism for leveling fishing line on the reel comprises a leveling control, extending through an aperture disposed in a longitudinal axis of the upper handle, mechanically coupled to a leveling actuator having an eyelet disposed within the opening wherein the eyelet travels the length of the opening upon displacement of the leveling control.

\* \* \* \* \*